Figure 1:
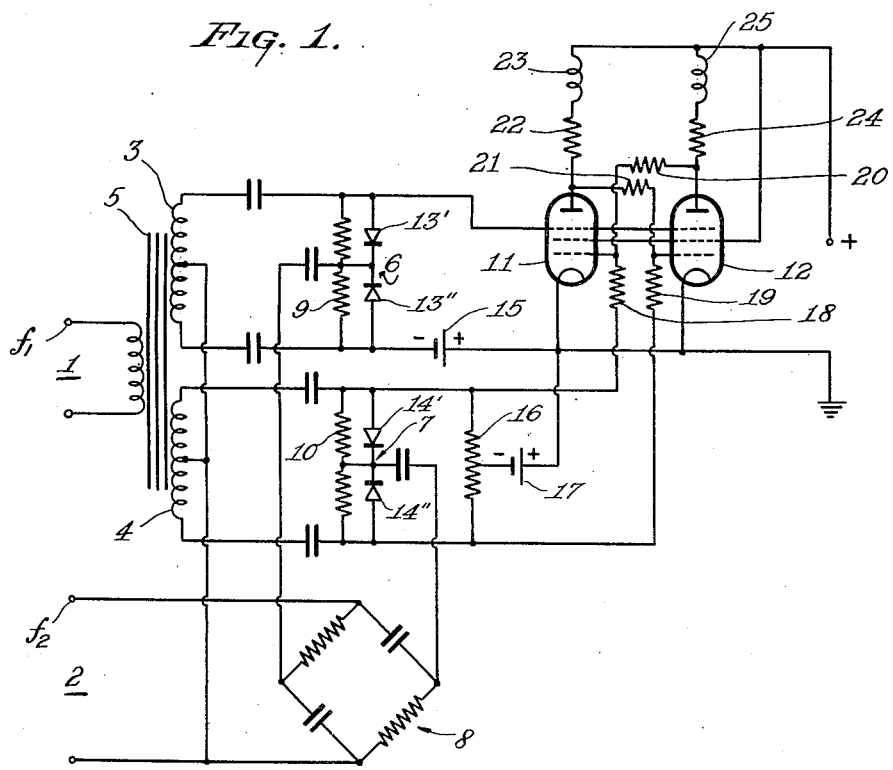

April 25, 1950     E. H. HUGENHOLTZ ET AL     2,505,642
FREQUENCY SYNCHRONIZING SYSTEM Filed July 20, 1946     2 Sheets-Sheet 1

EDUARD HERMAN HUGENHOLTZ
BONIFACIUS JOHANNES van HARDENBURG
INVENTORS.

BY *Fred M Vogel*

AGENT.

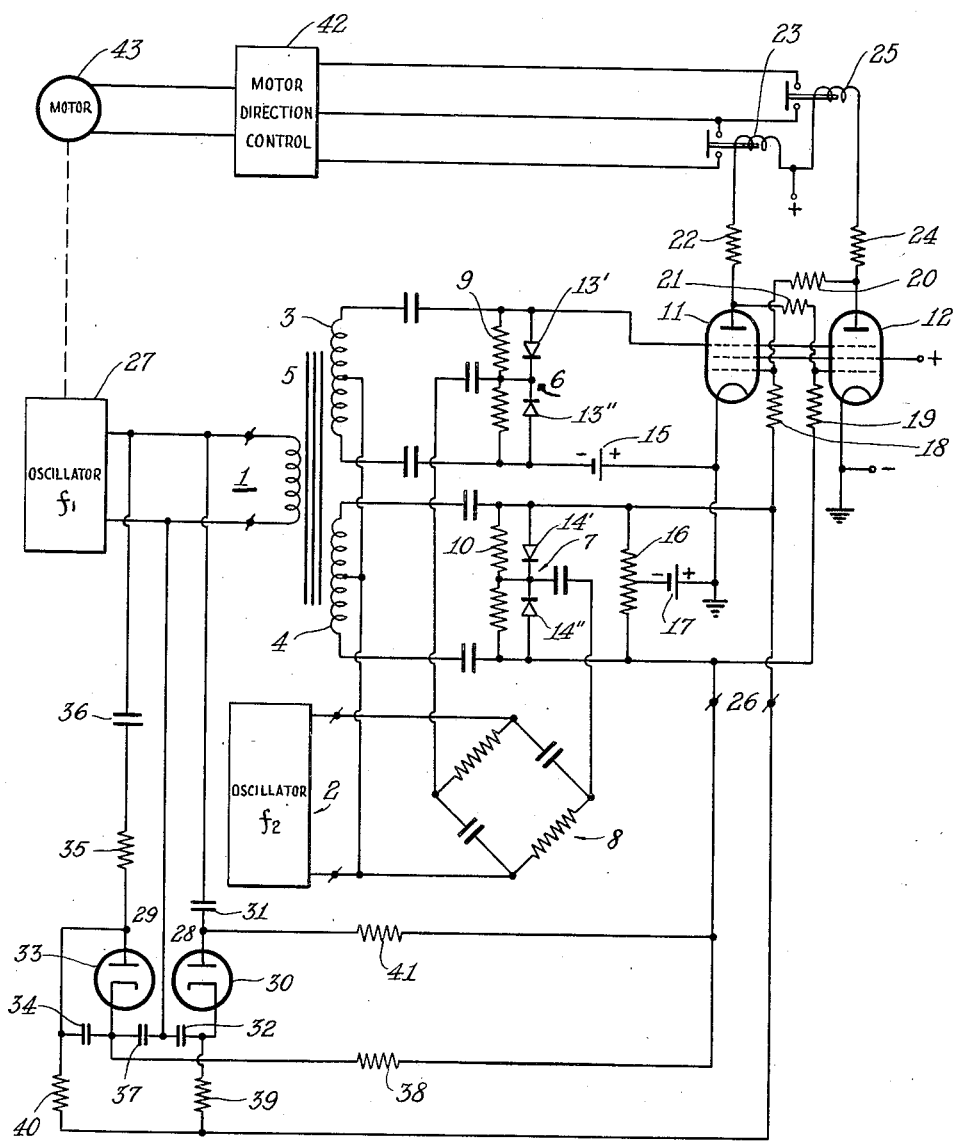

Patented Apr. 25, 1950

2,505,642

UNITED STATES PATENT OFFICE 2,505,642

FREQUENCY SYNCHRONIZING SYSTEM

Eduard Herman Hugenholtz and Bonifacius Johannes van Hardenberg, Eindhoven, Netherlands, assignors to Hartford National Bank and Trust Company, Hartford, Conn., as trustee Application July 20, 1946, Serial No. 685,123
In the Netherlands December 3, 1943

Section 1, Public Law 690, August 8, 1946
Patent expires December 3, 1963

8 Claims. (Cl. 250—36)

This invention relates to a circuit-arrangement for comparing and/or for controlling to equality the frequencies of two electrical oscillations.

According to the invention, from the said oscillations are derived at least two voltages of the differential frequency (an auxiliary voltage and an adjusting voltage) which have different phases. These voltages are supplied to a device which—so long as the said frequencies are unequal—is alternately released and switched off by the said auxiliary voltage and which at the moment of release selects one of two conditions of stable equilibrium depending upon the instantaneous direction of the said adjusting voltage, this direction being determined by the sign of the frequency difference between the two frequencies, whereas in the case of inequality of the frequencies the device is switched off by the auxiliary voltage as soon as the phase difference between the two oscillations drops below a determined value. From the said device are taken one or more output voltages (and/or output currents) with the aid of which the comparison and/or the control of the frequencies are effected.

By means of the well-known circuit-arrangements for the automatic frequency-control the frequencies of two oscillations can, in general, be made only approximately equal to one another. The circuit-arrangement according to the invention, on the contrary, offers the advantage that the frequencies of the two oscillations can be controlled to synchronism in a simple manner. The circuit-arrangement according to the invention exhibits furthermore the advantage that the operation is independent of the absolute values of the frequencies to be compared or controlled but depends solely on the frequency difference of the oscillations (of course with the exception of that part of the circuit-arrangement which generates the two voltages of the differential frequency). The circuit-arrangement may also be adjusted in such manner that in case of the suppression of one of the oscillations the said device is switched off so that the control is not disturbed. A very important advantage is furthermore that the control to synchronism is independent of the circuit elements used, more particularly of the properties of the discharge systems used.

Care should preferably be taken to insure that the voltage of the differential frequency exhibit a mutual phase difference of 90°.

Particularly satisfactory results are obtained if the said device consists of at least two discharge tubes each of which comprises, besides an anode, a cathode and a control grid, at least one additional grid, whilst the anode of each of the tubes is connected to the control grid of the other tube, the said additional grids being directly connected to one another. In this case the adjusting voltage is preferably supplied in antiphase to the control grids whilst the auxiliary voltage, which alternately releases and switches off the discharge tubes, is supplied to the directly interconnected grids.

The said device may also consist of at least two discharge tubes in which the adjusting voltage and the auxiliary voltage are both supplied to the control grids of these discharge tubes, the auxiliary voltage being supplied to the control grids in the same phase and the adjusting voltage being supplied thereto in anti-phase.

In a further embodiment of the invention the said device consists of a discharge tube comprising an anode, a cathode and at least three grids, the adjusting voltage and the auxiliary voltage being supplied to the first grid and to the third grid respectively. A positive feed-back is provided between the third and second grids and the output voltages or output currents serving for the control or for the comparison, are taken from the anode and from the second grid.

Figure 2:
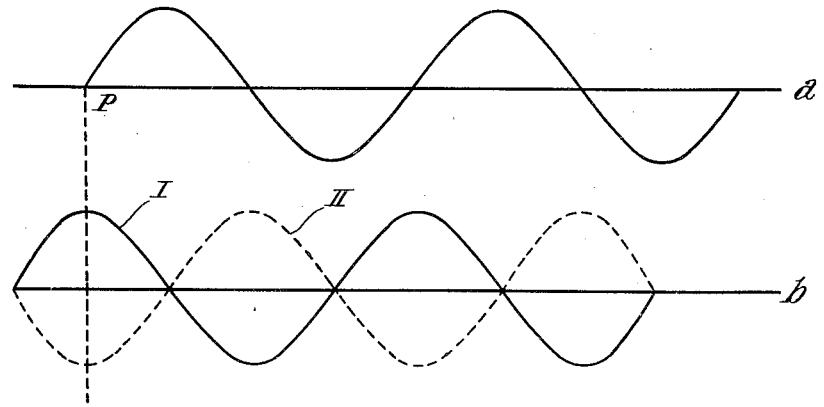

In order that the invention may be clearly understood and readily carried into effect, it will now be explained with reference to the accompanying drawing, in which Fig. 1 represents, by way of example, one embodiment of the invention. Fig. 2 shows the variation of the voltages of the differential frequency which are derived from the said oscillations; these voltages have a mutual phase difference of 90°. Fig. 3 represents a mechanical and a cooperating electric control device coupled to the circuit-arrangement shown in Fig. 1.

In the circuit-arrangement shown in Fig. 1 the said oscillations, whose frequencies are $f_1$ and $f_2$ respectively, are supplied to terminals 1 and 2 respectively. The oscillations of the frequency $f_1$ are transferred via the secondary windings 3 and 4 respectively of a transformer 5 to mixing stages 6 and 7 respectively which pertain to the circuit-arrangement. The oscillations of the frequency $f_2$ are supplied to a phase-rotating network 8, which consists of two resistances and two capacities which are included in a bridge circuit. From this network are taken two voltages which have both the frequency $f_2$ and which exhibit a mutual phase difference of 90°; one of these voltages is supplied to the mixing stage 6 and the other to the mixing stage 7.

The mixing stages 6 and 7 comprise each two detectors 13′, 13″ and 14′, 14″ respectively which are connected in opposition to one another, so that the direct current voltage components appearing during the mixing operation counterbalance each other at least partly.

By mixing the voltages of the frequencies $f_1$ and $f_2$ a voltage of the differential frequency $(f_2-f_1)$ is produced in each of the mixing stages 6 and 7, these voltages having a phase difference of 90°. They are taken from the output resistance 9 and 10 respectively and are supplied to the previosuly mentioned device which has two conditions of stable equilibrium.

This device is composed of two discharge tubes 11 and 12, which are constructed as pentodes whose respective cathodes, anodes and screen grids are connected to one another.

The voltage of the differential frequency which is produced in the mixing stage 6 and which is used as the auxiliary voltage is applied between the suppressor grids and the earthed cathodes of the two pentodes 11 and 12. In addition, a source of direct-current voltage 15 is connected in series with this voltage.

The voltage of the differential frequency which is produced in the mixing stage 7 and which acts as the adjusting voltage is supplied in antiphase to the control grids of the discharge tubes 11 and 12. To that end there is connected to the output terminals of the mixing circuit 7 a resistance 16, whose mid-point is connected through a source of direct-current voltage 17 to the cathodes of the discharge tubes. The ends of the resistance 16 are connected through a resistance 18 to the control grid of the tube 11 and through a resistance 19 to the control grid of the tube 12. The control grid of the discharge tube 11 is connected through a resistance 20 to the anode of the discharge tube 12 and the control grid of the tube 12 is connected through a resistance 21 to the anode of the tube 11.

In the anode circuit of the discharge tube 11 are connected in series a resistance 22 and the exciting winding of a relay 23. The anode circuit of the tube 12 likewise comprises a resistance 24 connected in series with the exciting winding of a relay 25. The screen grids of the discharge tubes are directly connected to a source of anode direct-current voltage (not shown).

The operation of the circuit-arrangement may be explained as follows:

The device consisting of the two pentodes has two conditions of stable equilibrium; in the one condition the pentode 11 carries current and the pentode 12 is blocked; in the other condition just the contrary is the case. With the aid of the voltage of the differential frequency which originates from the mixing stage 6 the two discharge tubes are alternately conducting and non-conducting at any rate as long as the frequencies to be compared are unequal. The point at which the pentodes become conducting due to a positive value of the auxiliary voltage is determined inter alia by the bias voltage originating from the source of direct-current voltage 15. Let us assume that this bias voltage is adjusted in such a manner that at the said point the auxiliary voltage has the value zero so that the said point corresponds to the point P in Fig. 2a which shows the variation of the auxiliary voltage. Fig. 2b shows the variation of the adjusting voltage. This voltage has a phase difference of 90° with respect to the auxiliary voltage and it consequently has its maximum positive or negative value at the moment (point P) when the auxiliary voltage has the zero value. The adjusting voltage is assumed to have at this moment its maximum positive value if $f_2$ is higher than $f_1$ (curve I) and its maximum negative value if $f_1$ is higher than $f_2$ (curve II).

At the moment when the device is released by the auxiliary voltage, the control grid of the pentode 11 is made more positive and at the same time the control grid of the pentode 12 more negative or conversely according as $f_2$ is higher or lower than $f_1$.

The device being once released, the auxiliary voltage has no longer any influence on the operation of the circuit-arrangement, until the moment when the auxiliary voltage has become again sufficiently negative to switch off the device. The behaviour of the device, i. e. the choice of one of the two conditions of equilibrium after the release is consequently solely determined by the direction of the adjusting voltage, provided that this voltage—remaining within determined limits—exceeds a determined value in that direction. Now if $f_2$ is higher than $f_1$, the control grid of the pentode 11 is at the moment of release, according to the example given above, more positive than the control grid of the pentode 12, with the result that the device is in that condition of equilibrium in which the pentode 11 carries current and the pentode 12 is blocked. This position is maintained until the whole of the device is switched off again by the auxiliary voltage. As long as $f_2$ is higher than $f_1$ this is repeated, the pentode 11 alternately carrying current and being blocked and the pentode 12 remains permanently blocked. In the time interval in which the pentode 11 carries current, the relay 23 is excited, which may result, for example, in switching on a motor 43 coupled to a motor direction control 42 (see Fig. 3) by which the frequency $f_1$ is increased. Alternatively the frequency $f_2$ may be decreased or both frequencies can be simultaneously adjusted to synchronism. Motor direction control 42 and motor 43 may be any one of the well-known combinations for performing the above-described function.

The relay 25 is excited in a similar manner if the frequency $f_2$ is lower than $f_1$, in which event the frequency $f_2$ is raised and/or the frequency $f_1$ is reduced.

This control continues until the frequencies $f_1$ and $f_2$ are equal, in which event the mixing stages 6 and 7 yield a direct-current voltage whose value and direction depend on the phase difference between the two frequencies to be compared. Now the circuit adjusts itself in such a manner that the auxiliary voltage (see Fig. 2a) becomes negative and remains so, for if this voltage acquires a positive value, the two discharge tubes are permanenty released and one of the two continuously carries current. Owing to this either of the relays 23 and 25 is continuously excited and the motor control is put into operation with the result that the phase difference between the oscillations is changed and this until the said direct-current voltage becomes nil or takes a negative value. Then the two discharge tubes are permanently switched off, the motor control remains inoperative and the frequencies $f_1$ and $f_2$ remain equal to one another. The phase difference between these frequencies may vary within a range of approximately 180° without the device being put into operation. This range approximately corresponds to the range within which the auxiliary voltage is negative (see Fig. 2a).

If the phase between the two oscillations changes, the auxiliary voltage finally becomes again positive; if the phase changes in the one direction, the one pentode is opened owing to the influence of the adjusting voltage, and if the phase changes in the other direction, the other pentode begins to carry current owing to the influence of the adjusting voltage, which has obtained now just the opposite sign. Within the range of approximately 180° in which the auxiliary voltage is negative, the circuit consequently does not react to phase differences between the initial oscillations, whereas in the case of larger phase divergences the control becomes operative and corrects these divergences.

The above-described control of the frequency of one of the oscillations or of the frequencies of both oscillations, which is solely effected by means of a mechanical control device (in the present case a motor) may efficiently be combined with a control of one of the frequencies or of both frequencies by an electric agency. Fig. 3 represents a circuit-arrangement relating to such a control. This circuit-arrangement may, for example, be connected to the adjusting voltage (see Fig. 2b). This voltage, which may be taken from the mixing stage 10 of the circuit-arrangement according to Fig. 1, is supplied to the terminals denoted by 26 in the figure.

The oscillatory circuit of the oscillator whose frequency has to be readjusted (for example, the oscillator which generates the frequency $f_1$) is diagrammatically shown in the figure at 27. This oscillatory circuit has connected in parallel with it two branches 28 and 29, the former consisting of the series-connection of a diode 30, a condenser 31 and a separating condenser 32 and the latter being constituted by the series-connection of a diode 33, which has a condenser 34 connected in parallel with it, a resistance 35 and two separating condensers 36 and 37. One of the terminals 26 is connected through a resistance 41 to the anode of the diode 30 and through a resistance 38 to the cathode of the diode 33 whereas the other terminal is connected through a resistance 39 to the cathode of the diode 30 and through a resistance 40 to the anode of the diode 33. The cathodes of the two diodes are interconnected through the said separating condensers 32 and 37.

The impedance of the branch 28 is substantially determined by the capacity of the condenser 31 and by the value of the internal resistance of the diode 30; the impedance of the branch 29 is substantially determined by the value of the resistance 35, the capacity of the condenser 34 and the value of the internal resistance of the diode 33.

The two diodes 30 and 33 are controlled by the voltage applied to the terminals 26. If the terminal connected via the resistance 41 to the anode of the diode 30 is positive with respect to the other terminal, the diode 30 becomes conductive, whereas the diode 33 is blocked with the result that the capacitative effect of the branch 28 is increased and the value of the capacity connected in parallel with the oscillator circuit 27 increases. If, on the contrary, the other terminal becomes positive, the diode 33 becomes conductive and the diode 30 is blocked. The consequence thereof is that the condenser 34 is short-circuited by the diode 33 to a higher or lower extent with the result that the capacitative effect of the branch 29 is reduced or in other words, that the value of the capacity connected in parallel with the oscillator circuit is decreased. According to the direction of the voltage applied to the terminals 26, the capacity pertaining to the oscillator circuit is consequently increased or decreased and accordingly the frequency of the oscillator is decreased or increased. However, this control only becomes operative in the correct manner if the motor control 42, hereinbefore described, has ensured that the two oscillations have approximately attained the point of synchronism.

The above-described additional control by electric means is important because by means of a mechanical control device alone it is in general not well possible, due to the inertia present, to obtain a stable control. The described mechanical control, however, offers the advantage that upon the suppression of one of the oscillations the already obtained control to frequency equality is not affected.

The electric control may be connected not only to the adjusting voltage but also, for example, to the difference between the anode voltages of the discharge tubes 11 and 12.

It is also possible to control the oscillations by electric agency to frequency equality, that is to say by connecting the discharge tubes 11 and 12 in such a manner that they act as reactances depending on the mutual conductance.

What we claim is:

1. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and displaced in phase with respect to said first voltage, a circuit comprising a first electric current path and a second electric current path, means responsive to said first voltage to cyclically open and close said electric current paths, means responsive to said second voltage to select one of said electric current paths during the period when said paths are open and to cause a current flow therein, the electric current path selected depending on the direction of the difference in frequency between said electric oscillations, means responsive to current flow in said first electric current path to vary the frequency of one of said electric oscillations in a given direction, means responsive to current flow in said second electric current path to vary the frequency of said electric oscillation in the opposite direction, and means to close both of said paths when said difference in frequency of said electric oscillations is equal to zero.

2. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and displaced 90° out of phase with respect to said first voltage, a circuit comprising a first electric current path and a second electric current path, means responsive to said first voltage to cyclically open and close said electric current paths, means responsive to said second voltage to select one of said electric current paths during the period when said paths are open and to cause a current flow therein, the electric current path selected depending on the direction of the difference in frequency between said electric oscillations, means responsive to current flow in said first electric current path to vary the frequency of one of said electric oscillations in a given direction, means responsive to current flow in said second electric current path to vary the frequency of said electric oscillation in the opposite direction, and means to close both of said paths when said difference in frequency of said electric oscillations is equal to zero.

3. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a control grid, a further grid and an anode, means to couple the anode of said first tube to the control grid of said second tube and means to couple the anode of said second tube to the control grid of said first tube to block said second tube when said first tube is conducting and conversely to block said first tube when said second tube is conducting, means to apply said first voltage in phase to said further grids of said first and said second electron discharge tubes to cyclically hold and release said tubes, means to apply said second voltage in anti-phase to the control grids of said first and said second electron discharge tubes to render one of said tubes conducting during the period when said tubes are released, the one of said tubes selected depending on the relative direction of the difference in frequency, means responsive to current flow in said first tube to vary the frequency of one of said oscillations in a given direction, means responsive to current flow in said second tube to vary the frequency of said one of said oscillations in the opposite direction, and means to block said electron discharge tubes when the difference in frequency of said electric oscillations is equal to zero.

4. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a grid and an anode, means to couple the anode of said first tube to the grid of said second tube, means to couple the anode of said second tube to the grid of said first tube to block said second tube when said first tube is conducting and conversely to block said first tube when said second tube is conducting, means to apply said first voltage in phase to said grids of said first and said second electron discharge tubes to cyclically hold and release said tubes, means to apply said second voltage in anti-phase to the grids of said first and said second electron discharge tubes to render one of said tubes conducting during the period when said tubes are released the one of said tubes selected depending on the relative direction of the difference in frequency, means responsive to current flow in said first tube to vary the frequency of one of said oscillations in a given direction, means responsive to current flow in said second tube to vary the frequency of said one of said oscillations in the opposite direction, and means to block said electron discharge tubes when the difference in frequency of said oscillations is equal to zero.

5. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a control grid, a screen grid, a further grid and an anode, means to couple the anode of said first tube to the control grid of said second tube, means to couple the anode of said second tube to the control grid of said first tube to block said second tube when said first tube is conducting and conversely to block said first tube when said second tube is conducting, means to apply said first voltage in phase to said further grids of said first and said second electron discharge tubes to cyclically hold and release said tubes, means to apply said second voltage in anti-phase to the control grids of said first and said second electron discharge tubes to render one of said tubes conducting during the period when said tubes are released depending on the relative direction of the difference in frequency, means coupled to the anode and screen grid of said first tube to vary the frequency of one of said oscillations in a given direction, means coupled to the anode and screen grid of said second tube to vary the frequency of said one of said oscillations in the opposite direction, and means to block said electron discharge tubes when the difference in frequency of said oscillations is equal to zero.

6. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a control grid, a further grid and an anode, means to couple the anode of said first tube to the control grid of said second tube, means to couple the anode of said second tube to the control grid of said first tube to block said second tube when said first tube is conducting and conversely to block said first tube when said second tube is conducting, means to apply said first voltage in phase to said further grids of said first and said second electron discharge tubes to cyclically hold and release said tubes, means to apply said second voltage in anti-phase to the control grids of said first and said second electron discharge tubes to render one of said tubes conducting during the period when said tubes are released depending on the relative direction of the difference in frequency, a first relay responsive to current flow in said first tube, mechanical means actuated by said first relay to vary the frequency of one of said oscillations in a given direction, a second relay responsive to current flow in said second tube, mechanical means actuated by said second relay to vary the frequency of said one of said oscillations in the opposite direction, and means to block said electron discharge tubes when the difference in frequency of said oscillations is equal to zero.

7. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a control grid, a further grid and an anode, means to couple the anode of said first tube to the control grid of said second tube, means to couple the anode of said second tube to the control grid of said first tube to block said second tube when said first tube is conducting and conversely to block said first tube when said second tube is conducting, means to apply said first voltage in phase to said further grids of said first and said second electron discharge tubes to cyclically hold and release said tubes, means to apply said second voltage in anti-phase to the control grids of said first and said second electron discharge tubes to render one of said tubes conducting during the period when said tubes are released depending on the relative direction of the difference in frequency, a first relay responsive to current flow in said first tube, mechanical means actuated by said first relay to vary the frequency of one of said oscillations in a given direction, a second relay responsive to current flow in said second tube, mechanical means actuated by said second relay to vary the frequency of said one of said oscillations in the opposite direction, electrical means responsive to a voltage of frequency proportional to the difference in frequency of said electric oscillations to vary the frequency of said one of said electric oscillations over a range of frequencies in the proximity of synchronism of said electric oscillations, and means to block said electron discharge tubes when the difference in frequency of said oscillations is equal to zero.

8. A circuit arrangement for comparing and equalizing the frequency of two electric oscillations, comprising means to produce a first voltage of frequency proportional to the difference in frequency between said two electric oscillations, means to produce a second voltage of frequency proportional to said difference in frequency between said two electric oscillations and being 90° out of phase with respect to said first voltage, a first and a second electron discharge tube having a cathode, a control grid, a further grid and an anode, means to couple the anode of said first tube to the control grid of said second tube, means to couple the anode of said second tube to the control grid of said first tube to block said second tube when said first tube is conducting and conversely to block said first tube when said second tube is conducting, means to apply said first voltage in phase to said further grids of said first and said second electron discharge tubes to cyclically hold and release said tubes, means to apply said second voltage in anti-phase to the control grids of said first and said second electron discharge tubes to render one of said tubes conducting during the period when said tubes are released depending on the relative direction of the difference in frequency, a first relay responsive to current flow in said first tube, mechanical means actuated by said first relay to vary the frequency of one of said oscillations in a given direction, a second relay responsive to current flow in said second tube, mechanical means actuated by said second relay to vary the frequency of said one of said oscillations in the opposite direction, a third and a fourth electron discharge tube having an anode and a cathode, a first capacitor and a second capacitor, means to couple said first capacitor in series with said third electron discharge tube across the frequency-determining circuit of said one of said electric oscillations, means to couple said second capacitor in series with said third electron discharge tube across said frequency-determining circuit, the resultant reactance of the capacity of said first capacitor and the internal resistance of said third electron discharge tube having a value at which the frequency of said one of said oscillations is varied in said given direction over a range of frequencies in the proximity of synchronism of said electric oscillations, and the reactance of the capacity of said second capacitor and the internal resistance of said fourth electron discharge tube having a value at which the frequency of said one of said oscillations is varied over said range of frequencies in said opposite direction, means responsive to said second voltage to render one of said third and fourth electron discharge tubes conducting to vary the frequency of said one of said oscillations in the corresponding direction, and means to block said electron discharge tubes when the difference in frequency of said oscillations is equal to zero.

EDUARD HERMAN HUGENHOLTZ.
BONIFACIUS JOHANNES
               van HARDENBERG.

REFERENCES CITED

The following references are of record in the file of this patent:

UNITED STATES PATENTS

| Number | Name | Date |
| --- | --- | --- |
| 2,104,801 | Hansell | Jan. 11, 1938 |
| 2,221,517 | Holters | Nov. 12, 1940 |
| 2,225,348 | Mikelson | Dec. 17, 1940 |
| 2,302,123 | Hepp | Nov. 17, 1942 |
| 2,408,451 | Sorensen | Oct. 1, 1946 |